United States Patent [19]

Sakatani et al.

[11] Patent Number: 4,788,101

[45] Date of Patent: Nov. 29, 1988

[54] FIBROUS STRUCTURE FOR REINFORCING A COMPOSITE MATERIAL AND A METHOD FOR MANUFACTURING THE FIBROUS STRUCTURE

[75] Inventors: Yoshiaki Sakatani; Tetsuya Yamamoto; Shigeru Nishiyama, all of Nagoya; Tetsuro Hirokawa, Omihachiman, all of Japan

[73] Assignees: Mitsubishi Jukogyo Kabushiki Kaisha, Tokyo; Shikishima Canvas Kabushiki Kaisha, Osaka, both of Japan

[21] Appl. No.: 151,049

[22] Filed: Feb. 1, 1988

[30] Foreign Application Priority Data

Feb. 3, 1987 [JP] Japan .................................. 62-23752

[51] Int. Cl.⁴ .............................................. B32B 7/00
[52] U.S. Cl. ................................ 428/34.5; 139/384 R; 139/387 R; 139/389; 428/257; 428/260; 428/262; 428/35.8; 428/36.3
[58] Field of Search ................... 428/35, 36, 257, 260, 428/262; 139/384 R, 387 R, 389

[56] References Cited

U.S. PATENT DOCUMENTS 4,725,485 2/1988 Hirokawa ......................... 428/225

*Primary Examiner*—Marion C. McCamish
*Attorney, Agent, or Firm*—Armstrong, Nikaido, Marmelstein & Kubovcik

[57] ABSTRACT

A fibrous structure for reinforcing a composite material which is a bottomed hollow pillar-shaped body having fins extending outwardly from a peripheral side wall of the body. The composite material-reinforcing fibrous structure consists of a plurality of longitudinally adjoining yarn section, each section being a plurality of layers, or tiers, of a first continuous yarn. A second continuous yarn is disposed substantially perpendicularly to the layers of first continuous yarn, and a third continuous yarn passes into loops formed in the second continuous yarn adjacent an outside layer of the first continuous yarn. The second continuous yarn functions as a common longitudinal component yarn in coextensive portions of the adjoining yarn sections and as an independent longitudinal component yarn in portions of the yarn sections which do not adjoin other yarn sections.

3 Claims, 9 Drawing Sheets

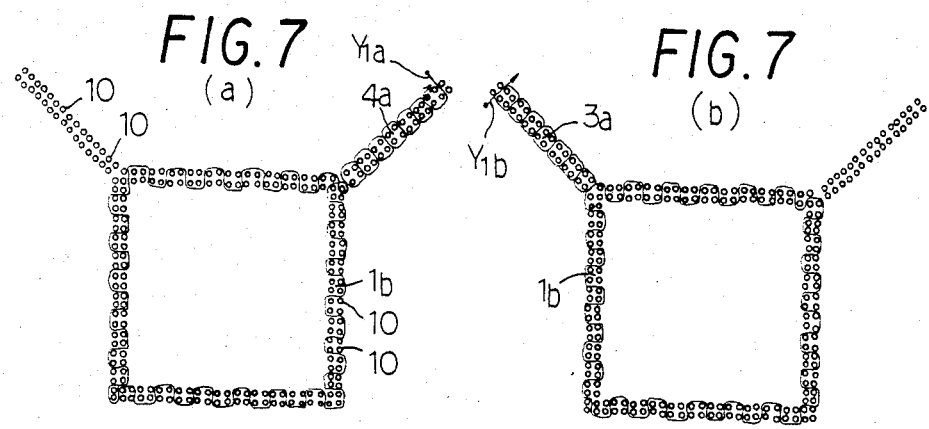
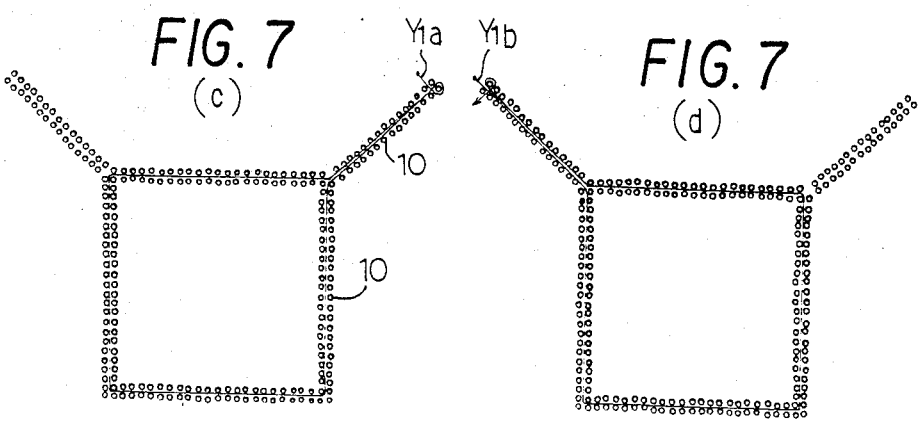
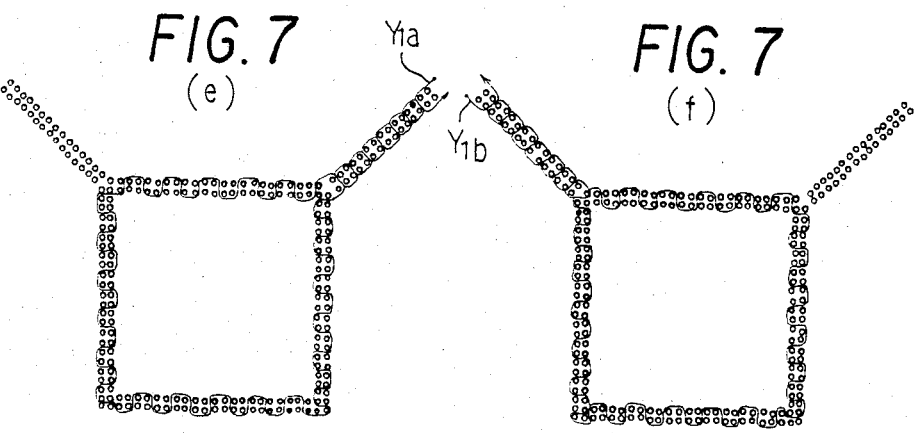

FIG. 8(a)
FIG. 8(b)
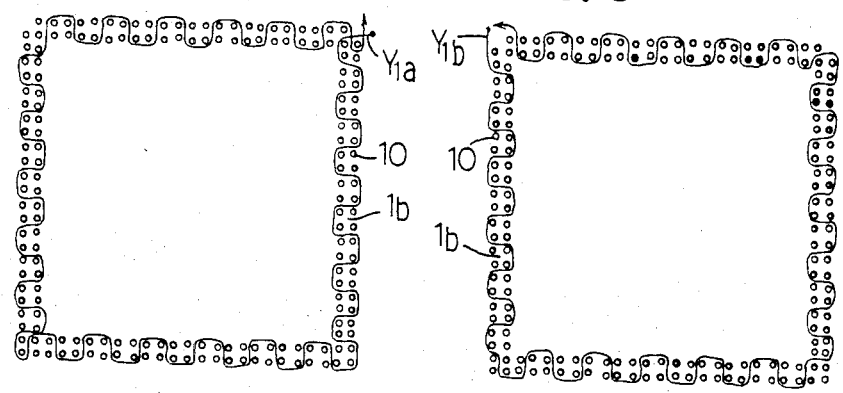
FIG. 8(c)
FIG. 8(d)
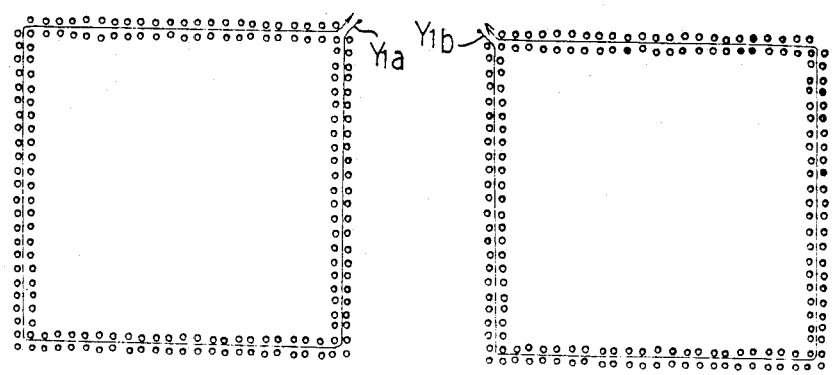
FIG. 8(e)
FIG. 8(f)
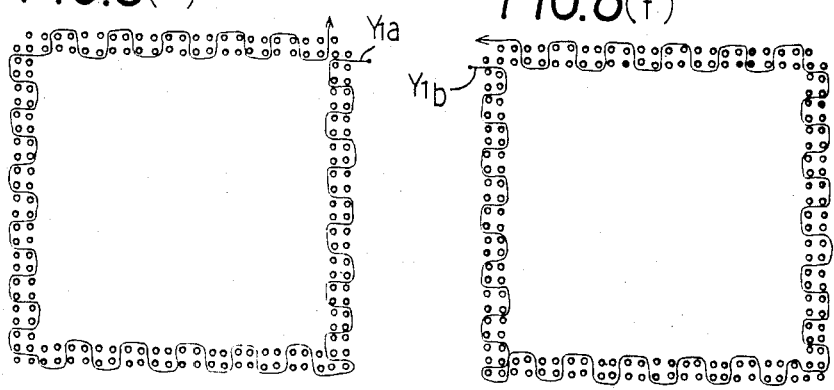

FIBROUS STRUCTURE FOR REINFORCING A COMPOSITE MATERIAL AND A METHOD FOR MANUFACTURING THE FIBROUS STRUCTURE

BACKGROUND OF THE INVENTION

1. Field of the Invention

This invention relates to a fibrous structure for reinforcing a composite material and a method of manufacturing the fibrous structure.

2. Prior Art

In the manufacture of mechanical devices required to have high strength for spacecraft, aircraft, automobiles, trains, marine craft and the like, fiber-reinforced composite materials made up of synthetic resins combined with various fibrous structures such as carbon fibers, glass fibers, aramid fibers, etc. have been utilized.

Composite materials reinforced by such fibrous structures are not only lightweight but are high in specific strength, specific rigidity and heat resistance, so that they have great value not only in the above-mentioned applications but also in many other industrial fields. The strength characteristics of such composite materials are largely dependent on the fiber content, weave and construction, matrix and the like of the fibrous structure used as a reinforcement. Methods for the manufacture of such fibrous structures have been disclosed, for example, in Japanese Laid-Open Patent Application (Kokai) Nos. 61-201063 and 59-71457, Japanese Laid-open Utility Model Application (Kokai) No. 61-37930 and other literature.

However, the known technology can be applied only when fibrous structures are comparatively simple in profile or configuration and only when various portions of each fibrous structure are comparatively uniform in fiber density. Moreover, in the manufacture of a fibrous structure having an intricate profile, a cutting operation must be performed which may cause breakage of fibers leading to reduced strength. Also, the known technology does not provide a usable means for manufacturing a bottomed hollow element, i.e., a hollow member having a bottom wall, and when it is desired to assure a large reinforcing effect in a selected direction, it is necessary to increase the strength of the entire fibrous structure, so that the resulting fibrous structure has the disadvantage of increased weight. Moreover, in forming an article having corners using a laminated fabric material, the resin forms pools in the corners which causes a decrease in strength or a sacrifice of strength at the joints.

It is an object of this invention, therefore, to provide a fibrous structure for reinforcing a composite material having a complicated profile, particularly a bottomed hollow pillar-shaped element having lateral projections such as fins, and which is capable of displaying high strength in a selected direction and is free of any remarkable fiber breakage or resin pools.

SUMMARY OF THE INVENTION

The present invention provides a fibrous structure for reinforcing a composite material which is a bottomed hollow pillar-shaped body having fins extending outwardly from a peripheral side wall of the body, the composite material-reinforcing fibrous structure consisting of a plurality of yarn sections disposed in a longitudinally adjoining arrangement, each of the yarn sections comprising a plurality of layers, or tiers, of first continuous yarn, a second continuous yarn disposed substantially perpendicularly to the layers of first continuous yarn, and a third continuous yarn passed into loops formed in the second continuous yarn adjacent an outside layer of the first continuous yarn, the second continuous yarn functioning as a common longitudinal component yarn in coextensive portions of the adjoining yarn sections and as an independent longitudinal component yarn in portions of the yarn sections which do not adjoin other yarn sections.

The invention further provides a method of manufacturing a fibrous structure for reinforcing a composite material which is a bottomed hollow pillar-shaped body composed of a plurality of yarn sections disposed in a longitudinally adjoining arrangement and fins extending outwardly from a peripheral side wall of the body, comprising arranging a plurality of yarn guide members upright at predetermined intervals according to the desired cross-sectional configuration of the fibrous structure, laying up a first continuous yarn along the yarn guide members to form a plurality of layers of a first-stage yarn section; forming loops of a second continuous yarn and causing the loops to engage the bottom ends of the respective yarn guide members in the portion of the first-stage yarn section where no more yarn is to be laid up thereon, pulling up the yarn guide members together with the loops of the second continuous yarn above the top layer of the first continuous yarn, removing the yarn guide members, passing a third yarn into the loops of second yarn as a tacking yarn so as to appropriately tighten the yarn layers of first continuous yarn by the second yarn to thereby complete the fabrication of the first-stage yarn section; laying up the first continuous yarn layer along the remaining yarn guide members to form layers of a second-stage yarn section, passing a further second continuous yarn in loops through the portion of the second-stage yarn section where no more yarn is to be laid up and through the adjoining portion of the first stage yarn section, passing the third continuous yarn through loops of the further second continuous yarn and tightening the yarn layers of the first continuous yarn by the further second continuous yarn, and repeating the above steps in succession for respective yarn sections to be formed in an adjoining fashion.

The composite material-reinforcing fibrous structure generally having a bottomed hollow pillar shape and fin members extending outwardly from the body is made up of a plurality of yarn sections disposed in longitudinally adjoining tiers and comprising layers of a first continuous yarn or yarns, with a second continuous yarn or yarns extending through coextensive parts of the adjoining yarn sections to thereby increase the longitudinal strength of the structure to a desired level. Further, in portions where no more yarn is to be laid up, a third continuous yarn or yarns as a tacking yarn is passed into loops formed in the second continuous yarn to serve as a means for preventing the second yarn from coming out of the layers of the first continuous yarn and to contribute to increased dimensional stability. Since the yarns are as continuous as possible, there is only a minimum number of yarn ends exposed on the outer surface of the fibrous structure and, therefore, a marked improvement is realized in the dimensional stability of the fibrous structure.

BRIEF DESCRIPTION OF THE DRAWINGS

FIGS. 6 through 9 are schematic views illustrating the lay-up patterns of the first continuous yarn in the respective yarn sections constituting the fibrous structure.

DESCRIPTION OF PREFERRED EMBODIMENTS

Figure 1:
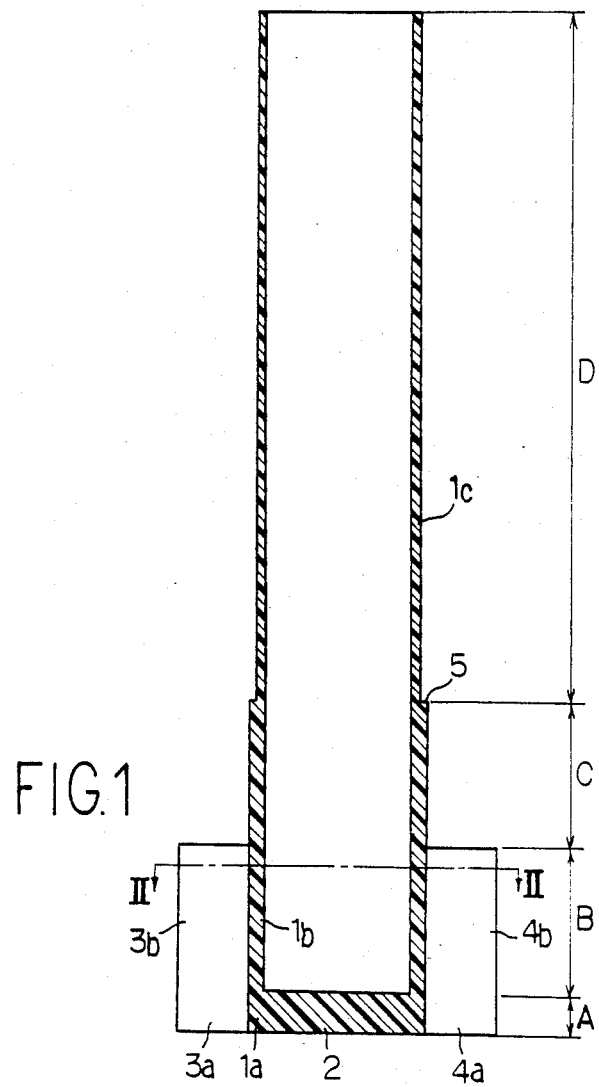
FIGS. 1 and 2 are front and transverse sectional views showing a fibrous structure manufactured in accordance with the present invention.
Figure 2:
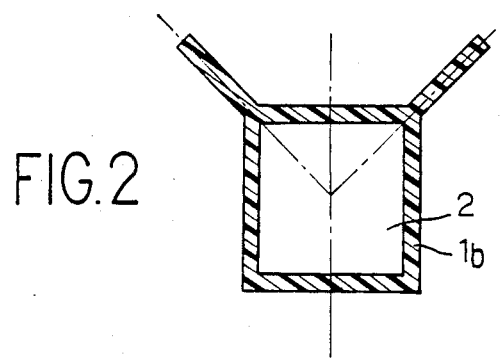

FIG. 1 is a longitudinal section of a fibrous structure for reinforcing a composite material which is used as an antenna fastener for aerospace use and FIG. 2 is a cross-sectional view taken along line II—II of FIG. 1. In the fibrous structure illustrated in FIGS. 1 and 2, a hollow square pillar-shaped bottom member (1a), a bottom wall (2) integral with the bottom of the bottom member (1a) and fins (3a) and (4a) extending outwardly from appropriate corners of the lateral peripheral wall of the hollow square pillar-shaped bottom member (1a) at a phase angle of 90 degrees, taken together, constitute a first-stage yarn section [designated as Section A in FIG. 1]. Disposed immediately on top of the first-stage yarn section (A) is a second-stage yarn section [designated as Section B in FIG. 1] which comprises a hollow square pillar-shaped member (1b) integral with the aforementioned bottom member (1a) and a couple of fins (3b) and (4b) which are integral with the aforementioned fins (3a) and (4a), respectively. The hollow square pillar-shaped member (1b) extends upwardly to constitute a third-stage yarn section not having fins on its lateral outer wall [designated as Section C in FIG. 1]. This third-stage yarn section (C) provides a step (5) at the top end of its peripheral side wall. Extending upwardly from the step (5), is a hollow square pillar-shaped member (1c) whose inner dimensions are identical with those of the hollow square pillar-shaped member (1b) to constitute a fourth-stage yarn section [designated as Section D in FIG. 1].

In order that the above fibrous structure may be used as a material for the fabrication of antenna fasteners for, for example, aerospace use, it must be lightweight and have a tensile as well as compressive strength of at least 6.5 tons in the direction of height [hereinafter the Z-axis direction]. For this purpose, a carbon fiber yarn such as Pyrophil $T_1$ [the trademark of Mitsubishi Rayon Co., Ltd. for its carbon fiber], 7 $\mu m^\phi \times 3000$ filaments, can be used as a first continuous yarn ($Y_1$) which constitutes the lateral, or horizontal, component yarn [X,Y-axes yarn] of the yarn sections and also as a third continuous yarn ($Y_3$) which constitutes a tacking yarn, while another type of Pyrophil $T_1$, 7 $\mu m^\phi \times 12000$ filaments, can be used as a second continuous yarn ($Y_3$) which constitutes the longitudinal, or vertical, component yarn [Z-axis yarn] of the yarn sections which passes through the first continuous yarn ($Y_1$).

To reconcile light weight with strength, this fibrous structure is so designed that the density of the carbon fiber yarns in its whole volume is kept within the range of 25 to 50 percent and that the density proportions (in terms of weight) of the X-axis component yarn and Y-axis component yarn of the first continuous yarn ($Y_1$) and the second yarn ($Y_2$) disposed along the Z-axis are in the ratio of about 20:20:60. The proportion of the third continuous yarn ($Y_3$) is very small.

Figure 12:
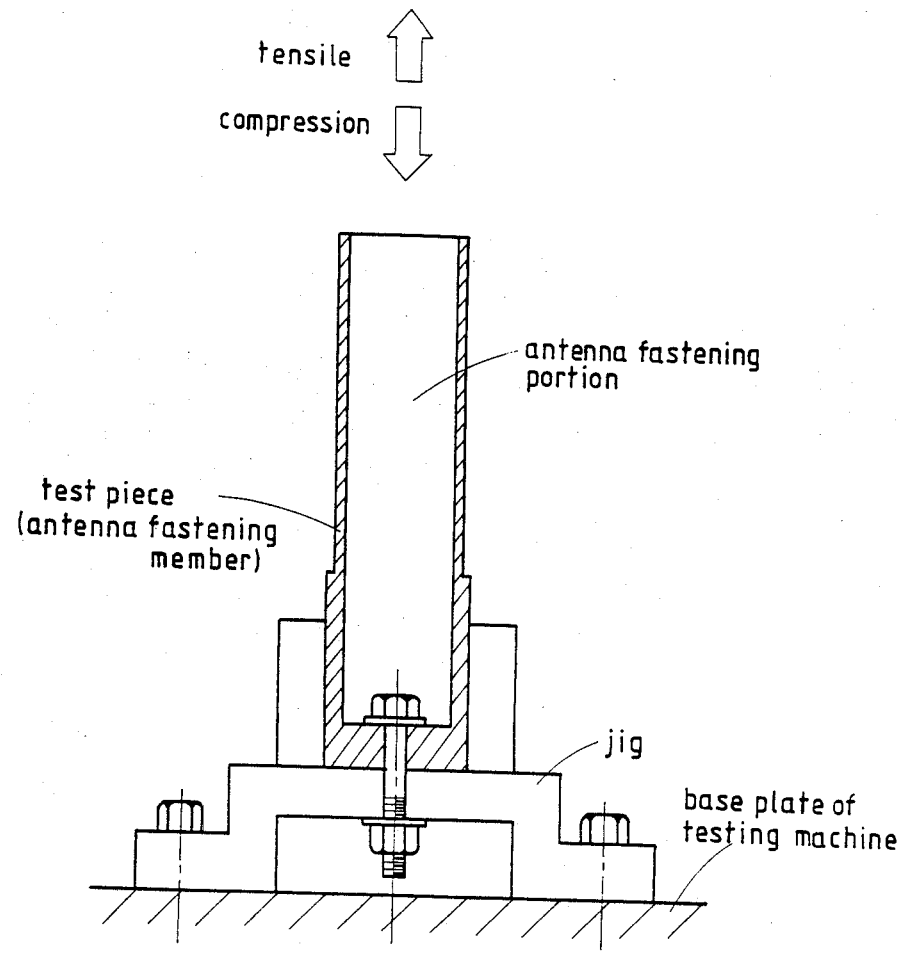
FIG. 12 is a sectional view of a testing installation for determining the tensile and compression strength of an antenna fastener as shown in FIGS. 1 and 2.

A fibrous structure according to the present invention and a comparative one manufactured in a conventional manner, i.e., comprising laminated two-dimensional parts, were each impregnated with the same epoxy resin and, after curing, antenna fastener members were formed, respectively. The fastener members were then subjected to tensile and compression tests on a testing installation as illustrated in FIG. 12. The data thus obtained is shown in the following table:

| Item | Inventive | Comparative |
| --- | --- | --- |
| weight (g) | 183 | 218 |
| manufacturing cost | 72 | 100 |
| specific strength (Kg/g) | | |
| compression | 37 | 29 |
| tensile | 39 | 40 |

It should be appreciated also that manufacturing costs for the fastener member formed from the fibrous structure of the present invention decreased 72% with respect to the comparative one. This is due to the fact that the present invention does not require conventional operations, namley, laminating, cutting, fabricating, and adhesive bonding. Weight per one fastener decreased by 84%. The fastener demonstrated a higher specific strength, meeting the specified level of 35 Kg/g, which is equivalent to a load of 6.5 tons, for both tension and compression.

The method for manufacturing the fibrous structure for use as a composite material in the fabrication of such antenna fasteners is described hereinafter. Prior to the detailed description, however, the basic principle of formation of the yarn sections (A), (B), (C) and (D) constituting the fibrous structure is explained below with reference to FIGS. 3 and 4.

As illustrated, a plurality of yarn guide members (10), (10) . . . are vertically movably supported in bearing holes (14) drilled in a base plate (13) made of a flexible material such as a polyamide (nylon) resin. Since the yarn guide members (10), (10) . . . are tubular, these members will be referred to as yarn guide tubes in the following explanation. Further, disposed on the base plate (13) parallel with each other are separators (15), (15) . . . , which are also made of a synthetic resin, such as the one mentioned above, or other suitable material, as means for supporting spacers (12), (12) . . . which will be described below, one separator between each row of two adjacent yarn guide tubes (10) and (10). Disposed on the separators (15), (15) . . . are the spacers (12), (12) . . . , each in the form of a thin plate or bar, or other desired sectional configuration, at right angles with the axial direction of the separators (15), (15) . . . , in a substantially horizontal position, one spacer between each two adjacent yarn guide tubes (10) and (10) in the same manner as the separators (15), (15) . . . The spacers (12) serve to prevent deflection and misarrangement of the yarn guide tubes (10), (10) . . . and, when necessary, to cooperate with pressure members (11), (11) to compress the yarn sections (A), (B), (C) and (D). The length of the yarn guide tubes (10), (10) . . . is so set that ends of the spacers (12), (12) . . . extend outwardly over the zone of yarn guide tubes (10), (10) . . . so as to assure engagement with the pressure members (11), (11) . . . which are described in detail hereinafter.

Figure 3:
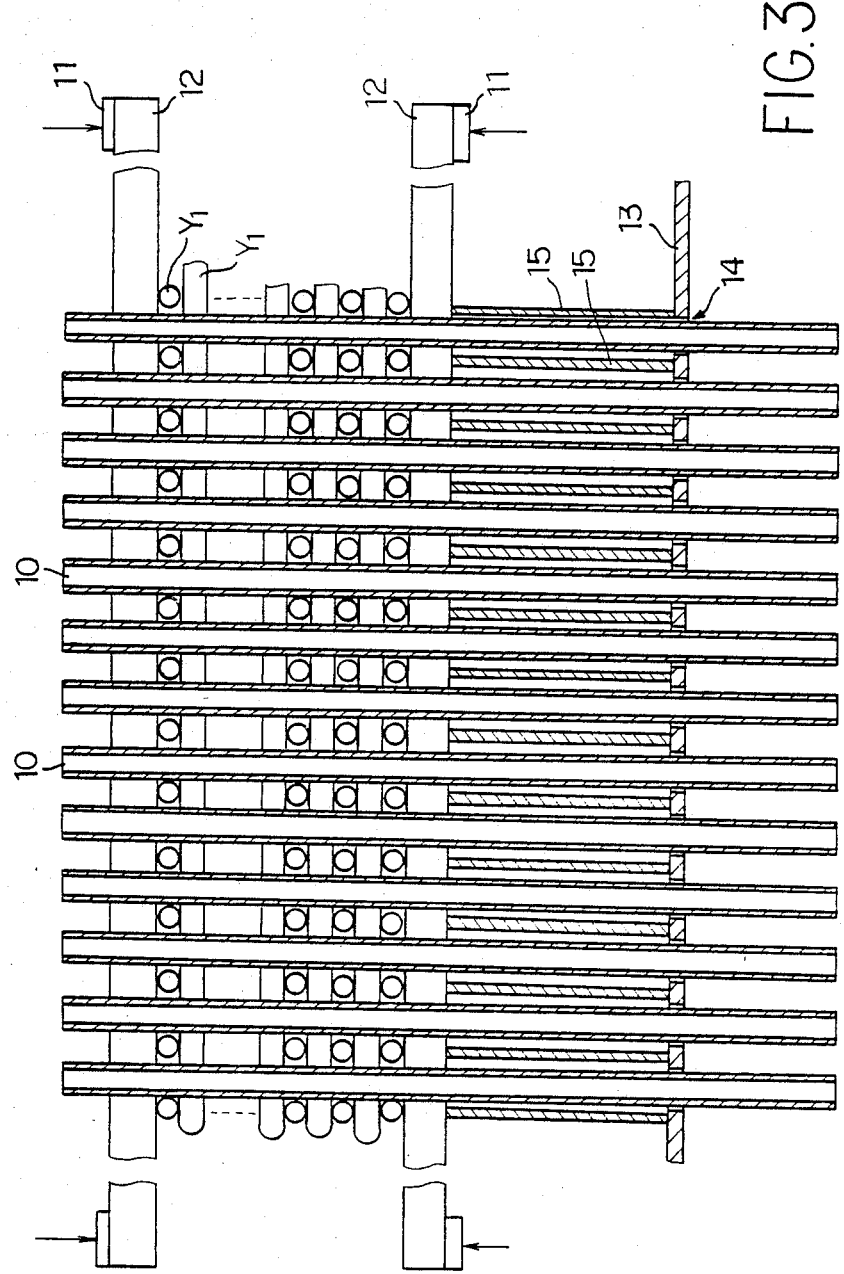
FIGS. 3 and 4 are schematic views showing the basic scheme of the method according to this invention.

First, as shown in FIG. 3, the first continuous yarn ($Y_1$) is laid in a serpentine fashion in the direction perpendicular to the axes of the spacers (12), (12) . . . along rows of the yarn guide tubes (10), (10) . . . to form a first plane, or layer, of the first continuous yarn and upon completion of the formation of the first layer, the first yarn ($Y_1$) is laid up in a serpentine fashion in the same manner as above but this time in the direction parallel to the axial direction of the spacers (12), (12) . . . to form a second plane, or layer. The number of layers of the first continuous yarn ($Y_1$) in the first yarn section is predetermined, taking into consideration the compression margin or allowance suitable for the designated size of the fibrous structure. To increase the yarn density of the first continuous yarn ($Y_1$) section, spacers (12), (12) . . . are disposed on the resulting continuous yarn ($Y_1$) section in the same direction as the spacers (12), (12) . . . lying beneath the yarn section. Then, pressure members (11), (11) . . . are abutted against ends of these spacers (12), (12) . . . projecting out from the zone of yarn guide tubes (10), (10) . . . and the first continuous yarn ($Y_1$) section is compressed from both the top and bottom sides through the spacers (12), (12) . . . and pressure members (11), (11) . . . By this compressive force, the yarn section made up of the first continuous yarn ($Y_1$) disposed in the X-axis and Y-axis directions is compressed to a predetermined yarn density and thickness. This compression of the section of the first continuous yarn ($Y_1$) running in X- and Y-axis directions between the spacers (12), (12) . . . and pressure members (11), (11) . . . may be performed in one operation after completion of lay-up of the first continuous yarn but when a thick yarn layer is to be fabricated, the compression may be carried out in several distinct steps in the course of lay-up of the first continuous yarn ($Y_1$) so as to build up the fiber density by degrees. In some instances, this operation may be partially omitted.

Figure 4:
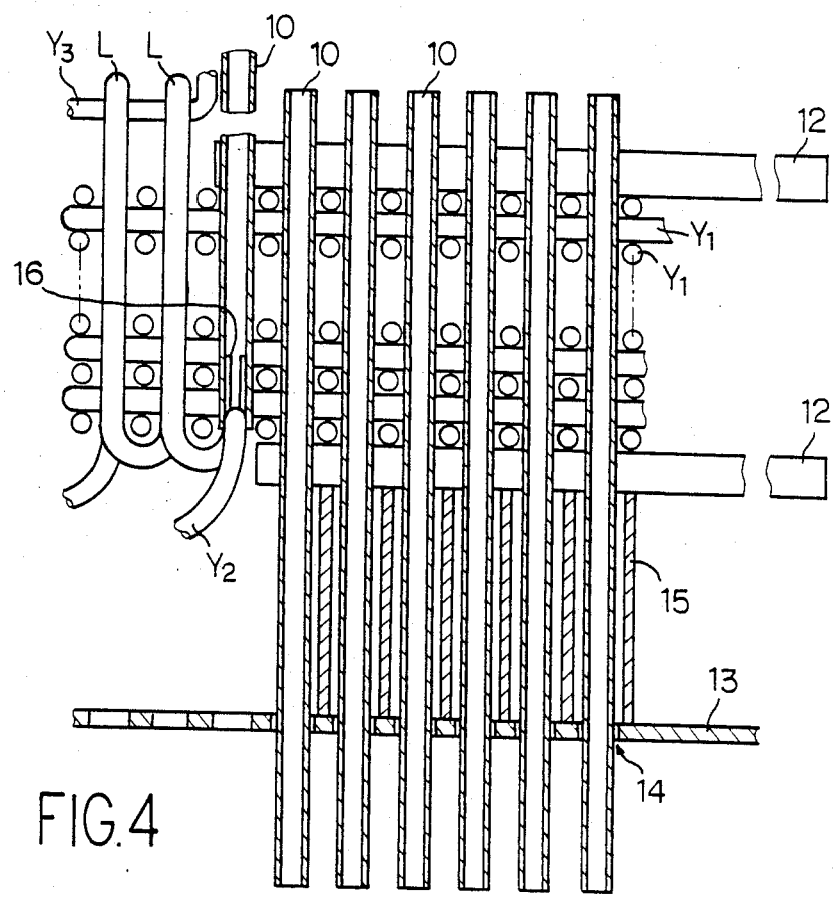

Then, as shown in FIG. 4, the insertion of the second continuous yarn ($Y_2$) is commenced upon completion of the formation of the first continuous yarn ($Y_1$) section. Thus, after detachment of the pressure members (11), (11) . . . , the separators (15) are successively removed and the yarn guide tubes (10) are raised close to the underlying spacers (12). The second continuous yarn ($Y_2$) is then folded into a loop and hooked on yarn guide (16). With the loop (L) of second continuous yarn ($Y_2$) thus formed remaining hooked on the yarn guide (16), the yarn guide is inserted into yarn guide tube (10). Then, the yarn guide tube (10) is pulled up and the loop (L) is drawn out on top of the yarn section of first continuous yarn ($Y_1$). In this position, the yarn guide tube (10) is removed, after which the third continuous yarn ($Y_3$) is passed into the loop (L) as a tacking yarn. Then, tension is applied as required to the second continuous yarn ($Y_2$) to pull it back down so as to compress the first continuous yarn ($Y_1$) section in succession. The above passage of the second continuous yarn is repeated a number of times equal to the number of yarn guide tubes (10) in the area where no more continuous yarn is to be laid up on the first continuous yarn ($Y_1$) section, and the compression of the yarn section by the second continuous yarn ($Y_2$) is repeated a number of times corresponding to the number of yarn guide tubes (10) disposed in that area, whereby the fiber density of the fibrous structure is increased to a predetermined level. By serial passage of the third continuous yarn ($Y_3$) into the loops (L), the third continuous yarn ($Y_3$) is laid up in a serpentine fashion on top of the yarn.

As this lay-up procedure is repeated, there is formed a fibrous structure consisting of a predetermined number of yarn sections, for example, four yarn sections (A), (B), (C) and (D). The resulting fibrous structure is impregnated with a thermosetting resin, a thermoplastic resin, pitch or the like to give a final composite product.

As the constituent yarns of the fibrous structure, there can be employed any suitable reinforcement fibers such as carbon fiber, glass fiber, aramid fiber, metal fiber, etc. either singly or in combination.

The sequence of fabrication of a fibrous structure for reinforcing composite materials for use as the antenna fastener illustrated in FIGS. 1 and 2 is explained below.

Figure 5:
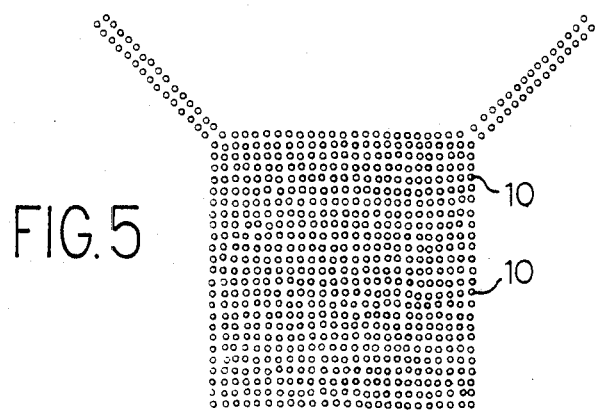
FIG. 5 is a plan view showing the arrangement of yarn guide tubes.

Referring, first, to FIG. 5, a predetermined number of yarn guide tubes (10), (10) . . . are erected through separators (15) and spacers (12) on the base plate (13) and, in this condition, the lay-up of the first-stage yarn section (A) is started in accordance with the procedure described hereinbefore and illustrated in FIGS. 3 and 4. The first-stage yarn section (A) constitutes a part corresponding to the base of the antenna fastener.

Figure 6:
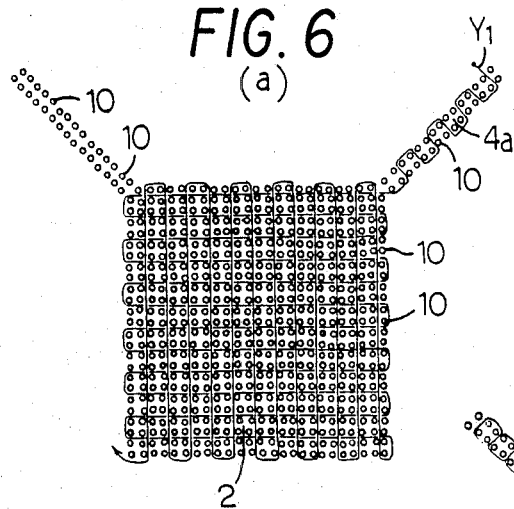
Figure 6:
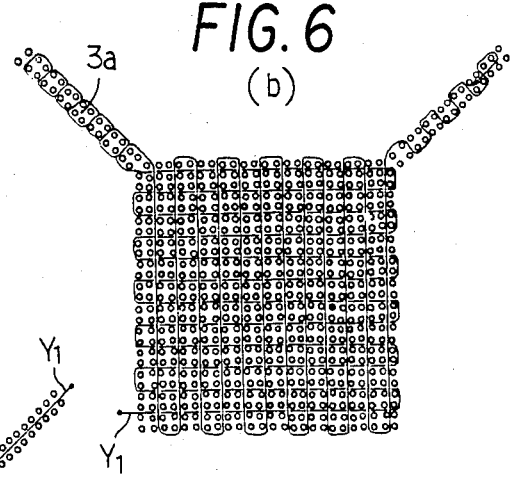
Figure 6:
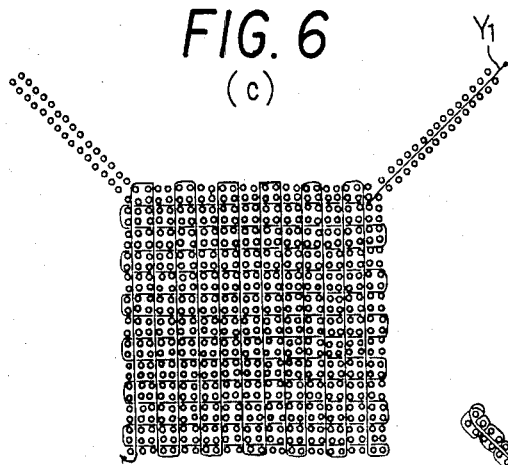
Figure 6:
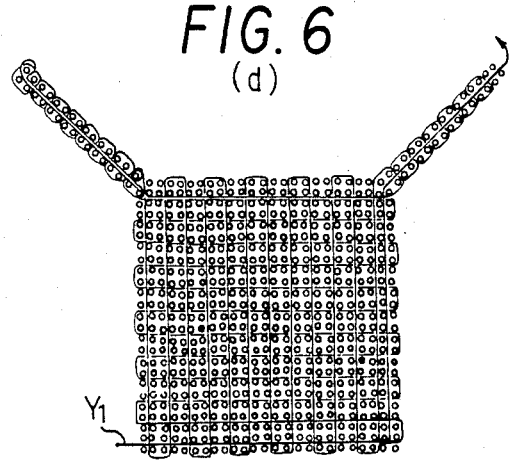

The lay-up patterns of first continuous yarn ($Y_1$) are shown in FIGS. 6(a), (b), (c) and (d). In this embodiment, one cycle of yarn lay-up consists of the 4 patterns of (a), (b), (c) and (d) and this cycle is repeated until the first-stage yarn section (A) attains a predetermined thickness. It should be understood that the lay-up patterns for the first continuous yarn ($Y_1$) are not limited to those illustrated in FIG. 6 but any other patterns can be adopted as long as the fibrous structure has a uniform yarn density and the first continuous yarn ($Y_1$) can be laid out without strain. In the lay-up patterns of FIG. 6, the first continuous yarn ($Y_1$) passes around two yarn guide tubes (10), (10) at its inflection points but this is intended to ensure a smooth surface of the fibrous structure and prevent local pooling of the resin. The number of yarn guide tubes (10) around which the yarn passes at the inflection points is optional as long as there is no unevenness in yarn density. Upon completion of the lay-up of the first continuous yarn ($Y_1$) for the formation of yarn section (A), the yarn section (A) is compressed through the pressure members (11) and spacers (12). Then, the second continuous yarn ($Y_2$) as a longitudinal component yarn is passed through the yarn section (A) in the area corresponding to the bottom wall (2) where no further lay-up of the first continuous yarn is to take place. Thus, the separators (15), (15) . . . disposed in the bottom wall area (2) are removed in succession and the yarn guide tubes (10), (10) . . . situated in the bottom wall area are pulled up close to the spacers (12), (12) . . . In this position, the second continuous yarn ($Y_2$) folded in the form of a loop is passed into a yarn guide tube (10) from the lower end thereof. After the loop (L) of the second continuous yarn ($Y_2$) has emerged from the top end of the yarn guide tube (10), the yarn guide tube (10) is pulled out and the third continuous yarn ($Y_3$) as a tacking yarn is passed into the loop (L) projecting out of yarn section (A) at the surface of the bottom wall area (2). Then, the second continuous yarn ($Y_2$) is pulled back down toward the bottom of the first yarn section (A) and the first yarn ($Y_1$) section is tightened. This operation is repeated by successively pulling out the yarn guide tubes (10), (10) . . . disposed in the bottom wall area (2), whereby the second continuous yarn ($Y_2$) as the longitudinal, or vertical, component yarn is positioned only in the area corresponding to the bottom wall area (2), whereas the first-stage yarn section (A) is free of the longitudinal, or vertical, component yarn in the other areas (1a), (3a), and (4a). Then, some of the separators (15) are returned to their original position to maintain a gap between the yarn section and the base plate (13).

In the formation of the first-stage yarn section (A), the yarn guide tubes (10) disposed in the bottom wall area (2) may be made shorter in length than the yarn guide tubes (10) disposed in the areas other than the bottom wall area (3) so as to facilitate passage of the second continuous yarn ($Y_2$). The formation of the bottom wall area (2) is done prior to that of the other areas because it would be difficult, after completion of lay-up of the hollow square pillar-shaped portion, to pass the second continuous yarn ($Y_2$) into the bottom wall portion (2) and the third continuous yarn ($Y_3$) into loops (L) of the second continuous yarn ($Y_2$) formed at the surface of the bottom wall area (2). When the lay-up of the first-stage yarn section (A) has been completed, the yarn guide tubes (10), (10) . . . erected in the area surrounding the bottom wall area (2), which are vertically movable, may be pulled out either upwardly or downwardly, to facilitate the passage of the second continuous yarn ($Y_2$) from below the bottom wall area (2), passage of the third continuous yarn ($Y_3$) into the loops (L) on the bottom wall area (2) and the pulling-back of the second continuous yarn ($Y_2$) in the downward direction.

After completion of lay-up of the first-stage yarn section (A), all the yarn guide tubes (10), (10) . . . in the bottom wall area (2) are removed, excepting the yarn guide tubes (10), (10) . . . in the areas corresponding to the bottom end (1a) of the body and the fins (3a), (4a). At this point, lay-up of the second yarn section (B) corresponding to the square-pillar portion (1b) of the body and including the fins (3b), (4b) is started. Thus, in accordance with the six lay-up patterns shown in FIGS. 7(a), (b), (c), (d), (e) and (f), two first continuous yarns ($Y_{1a}$) and ($Y_{1b}$) are laid up. The two first continuous yarns ($Y_{1a}$) and ($Y_{1b}$) are used in combination because, since two fins (3a), (3b) and (4a), (4b) extend radially from the side peripheral wall of the body (1b) forming a hollow square pillar, the yarn section (B) cannot be produced with a uniform structure with only one of the first continuous yarns ($Y_{1a}$) and ($Y_{1b}$). One of the continuous yarns ($Y_{1a}$) is laid up in accordance with the lay-up patterns shown in FIGS. 7(a), (c) and (e), while the other yarn ($Y_{1b}$) is laid up in the patterns shown in FIGS. 7(b), (d) and (f). Thus, the six patterns are repeated in the sequence of FIGS. 7(a), (b), (c), (d), (e) and (f) a predetermined number of times to complete the disposition of the first continuous yarns ($Y_{1a}$) and ($Y_{1b}$) in the second-stage yarn section (B). The continuous yarns ($Y_{1a}$) and ($Y_{1b}$) are linearly arranged in the lay-up patterns shown in FIGS. 7(c) and (d) because if the first yarns ($Y_{1a}$) and ($Y_{1b}$) are disposed in serpentine patterns throughout, the fibrous structure would be inadequate in strength in the lateral, or horizontal, direction, i.e., along the X and Y axes, and the dimensional stability of the yarn section (B) would be low. More specifically, the above arrangement is used in order to assure a greater integration of the fins with the body portion so that the fins will not be torn off or destroyed at the root when subjected to a tensile force. Furthermore, because the first continuous yarns ($Y_{1a}$) and ($Y_{1b}$) are laid up in different lay-up patterns, the yarn density in the direction in which a greater strength is required is intentionally increased while the yarn density in the other directions is kept coarse to thereby reduce the weight of the final fibrous structure while its other necessary characteristics are preserved.

Upon completion of the lay-up of the first continuous yarns ($Y_{1a}$) and ($Y_{1b}$) in the yarn section (B), the second continuous yarn ($Y_2$) formed with an end loop (L) is passed into each of the yarn guide tubes (10) erected in the areas corresponding to the fins (3a), (3b) and (4a), (4b) and after emergence of the loop (L) from the top of the layers of first continuous yarns ($Y_{1a}$), ($Y_{1b}$) forming the fins (3b), (4b), the yarn guide tube (10) is pulled out. Then, as a tacking yarn, the third continuous yarn ($Y_3$) is passed into the above loop (L) and the second continuous yarn ($Y_2$) is pulled back down to compress the layers of first continuous yarns ($Y_1$), ($Y_{1a}$) and ($Y_{1b}$). The above operation is repeated and the yarn guide tubes (10), (10) . . . erected in the areas corresponding to the fins (3a), (3b) and (4a), (4b) are sequentially pulled out to complete the fabrication of the yarn section (B) consisting of a hollow square pillar-shaped body (1b) and fins (3a), (3b), (4a) and (4b). Thus, in this stage, the second continuous yarn ($Y_2$) expected to function as a longitudinal, or vertical, component yarn is passed into the yarn sections forming the fins (3a), (4a), (3b) and (4b) where the longitudinal, or vertical, component yarn was not passed in the preceding stage, whereby a portion of the yarn section (A) is integrally joined to a portion of the yarn section (B). Then, in accordance with the lay-up patterns shown in FIGS. 8(a), (b), (c), (d), (e) and (f), the lay-up of the yarn section (C) is started. This lay-up procedure is fundamentally the same as that for the yarn sections (A) and (B) and, therefore, the steps which are duplicated are not described. However, the lay-up procedure is repeated in cycles each consisting of 6 patterns, namely, the 3 patterns shown in FIGS. 8(a), (c) and (e) and the 3 patterns shown in FIGS. 8(b), (d) and (f) so that two first continuous yarns ($Y_{1a}$) and ($Y_{1b}$) are laid up along the yarn guide tubes (10), (10) . . . Thereafter, the compression by means of spacers (12) and pressure members (11) is carried out. Then, the second continuous yarn ($Y_2$) formed with an end loop (L) is passed from the bottom side of the yarn section (A) with the yarn guide tubes of the outer one of the two rows of yarn guide tubes (10), (10) . . . , followed by passage of the third continuous yarn ($Y_3$) into the loop (L) and the selective removal of the outer row of the yarn guide tubes to complete the fabrication of the third-stage yarn section (C) having a peripheral step (5).

Figure 9A:
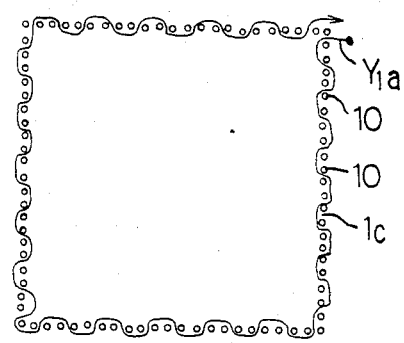
Figure 9B:
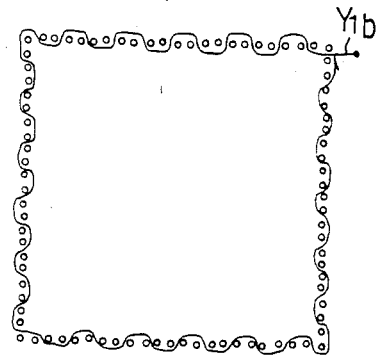
Figure 9C:
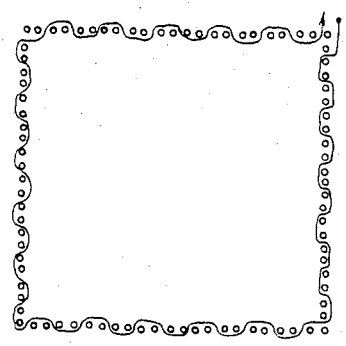
Figure 9D:
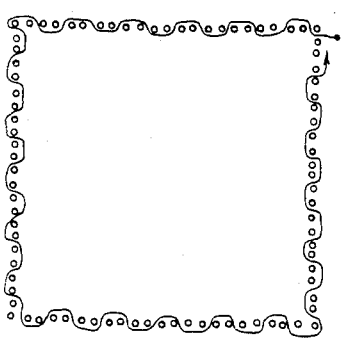

Finally, in accordance with the lay-up patterns shown in FIGS. 9(a), (b), (c) and (d), the lay-up of the fourth-stage yarn section (D) is started. Thus, the lay-up cycle consisting of a total of 4 patterns, namely the two patterns shown in FIGS. 8(a) and (c) and the two patterns shown in FIGS. 8(b) and (d), is repeated to lay up two first yarns ($Y_{1a}$) and ($Y_{1b}$) along the yarn guide tubes (10), (10) . . . Thereafter, compression by means of spacers (12) and compression members (11) is performed. Then, the second continuous yarn ($Y_2$) formed with an end loop (L) is passed through the four stages of yarn sections (A), (B), (C) and (D) from the bottom side of the first-stage section (A), followed by passage of the third continuous yarn ($Y_3$) into the loop (L) and the withdrawal of the yarn guide tubes (10), (10) . . . disposed in portions of the bottom end of the body (1a) and of the hollow pillar-shaped body (1b) and (1c) to complete the fabrication of the yarn section (D).

In the above manner, there is fabricated a fibrous structure for reinforcing a composite material for use as the antenna fastener for aerospace use shown in FIGS. 1 and 2.

Figure 10:
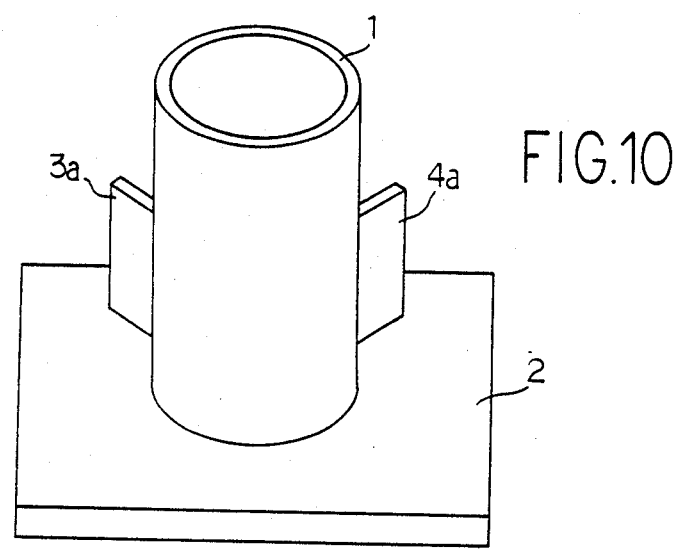
FIGS. 10 and 11 are perspective views illustrating other embodiments of fibrous structures manufactured in accordance with the present invention.
Figure 11:
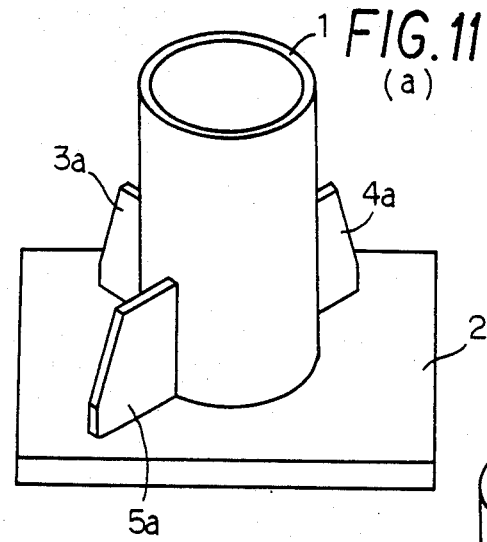
Figure 11:
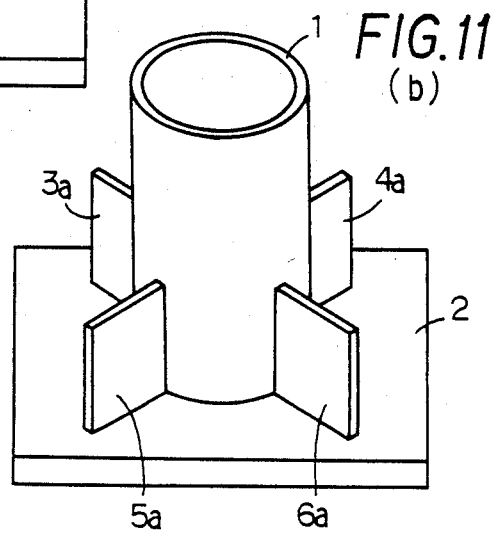
Figure 11C:
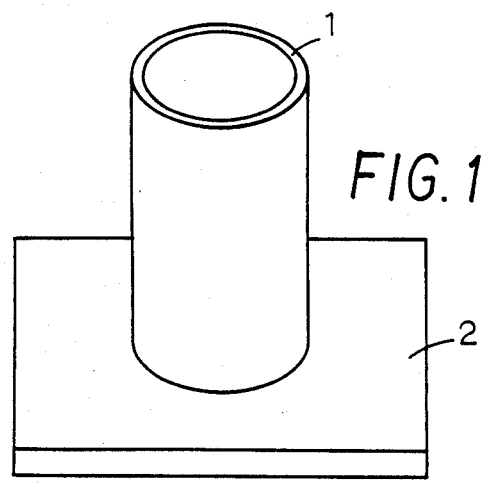

The composite structure shown in FIG. 10 comprises a cylindrical body (1) and a bottom wall (2) extending out from the peripheral wall of the body (1). The body (1) and bottom wall (2) may have other optional configurations, for example, a circle or a square. Moreover, as shown in FIGS. 11(a), (b) and (c), the shape and number of fins may also be freely selected.

In accordance with the present invention it is now possible to manufacture a fibrous structure for reinforcing a composite material having a bottomed cylindrical or pillar shape and fins extending outwardly from the periphery of the body. Despite its complicated shape, this fibrous structure comprises uninterrupted lengths of yarn arranged linearly and integrally so that the strength or tenacity of the yarns is assured to be used to the maximum extent. Furthermore, the pattern and the lay-up density of yarn can be freely selected in accordance with the designed distribution of strength. Therefore, the weight of the fibrous structure can be reduced while the necessary strength characteristics are maintained. As a result, it is now possible to meet the stringent requirements of space and aircraft applications. Furthermore, since the present invention does not call for a cutting operation, there is no incidence of yarn breakage. Moreover, as the invention does not involve a gluing, bonding, seaming or other joining operation for intricately shaped portions which have heretofore been required, the peeling or detachment of the yarn at such positions can be effectively precluded.

What is claimed is:

1. A fibrous structure for reinforcing a composite material, said fibrous structure being a bottomed hollow pillar-shaped body comprising a plurality of yarn sections disposed in a longitudinally adjoining arrangement, each of said yarn sections comprising a plurality of longitudinally adjoining layers of a first continuous yarn, said first continuous yarn being disposed within each layer in a plane substantially perpendicular to the longitudinal direction; a second continuous yarn extending through said layers in a plurality of longitudinally extending segments uniformly distributed with said section, each segment being substantially perpendicular to the plane of each of said layers and having a loop formed therein adjacent the last layer of first continuous yarn within the section; and a third continuous yarn extending through said loops, said second continuous yarn functioning as a common, longitudinal component yarn in coextensive portions of the adjoining yarn sections and as an independent longitudinal component yarn in portions of the yarn sections which are not coextensive with other yarn sections.

2. A method of manufacturing a fibrous structure for reinforcing a composite material which is a bottomed hollow pillar-shaped body composed of a plurality of yarn sections disposed in a longitudinally adjoining arrangement, comprising arranging a plurality of yarn guide members upright at predetermined intervals according to the desired cross-sectional configuration of the fibrous structure, laying up a first continuous yarn along the yarn guide members to form a plurality of layers of a first-stage yarn section; forming loops of a second continuous yarn and causing the loops to engage the bottom ends of the respective yarn guide members in the portion of the first-stage yarn section where no more yarn is to be laid up thereon, pulling up the yarn guide members together with the loops of the second continuous yarn above the top layer of the first continuous yarn, removing the yarn guide members, passing a third yarn into the loops of second yarn as a tacking yarn so as to appropriately tighten the yarn layers of first continuous yarn by the second yarn to thereby complete the fabrication of the first-stage yarn section; laying up the first continuous yarn layer along the remaining yarn guide members to form layers of a second-stage yarn section, passing a further second continuous yarn in loops through the portion of the second-stage yarn section where no more yarn is to be laid up and through the adjoining portion of the first stage yarn section, passing the third continuous yarn through loops of the further second continuous yarn and tightening the yarn layers of the first continuous yarn by the further second continuous yarn, and repeating the above steps in succession for respective yarn sections to be formed in an adjoining fashion.

3. The fibrous structure of claim 1 which is a hollow pillar-shaped body having a solid bottom wall and having a fin extending outwardly from a peripheral side wall of the body.

* * * * *